US010732976B2

(12) United States Patent
Robertson et al.

(10) Patent No.: US 10,732,976 B2
(45) Date of Patent: Aug. 4, 2020

(54) INTEGRATED CIRCUIT PROCESSOR AND METHOD OF OPERATING THE INTEGRATED CIRCUIT PROCESSOR IN DIFFERENT MODES OF DIFFERING THREAD COUNTS

(71) Applicants: Alistair Robertson, Glasgow (GB); Jeffrey W. Scott, Austin, TX (US)

(72) Inventors: Alistair Robertson, Glasgow (GB); Jeffrey W. Scott, Austin, TX (US)

(73) Assignee: NXP USA, Inc., Austin, TX (US)

( * ) Notice: Subject to any disclaimer, the term of this patent is extended or adjusted under 35 U.S.C. 154(b) by 312 days.

(21) Appl. No.: 14/655,122

(22) PCT Filed: Jan. 10, 2013

(86) PCT No.: PCT/IB2013/050213
§ 371 (c)(1),
(2) Date: Jun. 24, 2015

(87) PCT Pub. No.: WO2014/108747
PCT Pub. Date: Jul. 17, 2014

(65) Prior Publication Data
US 2015/0370568 A1    Dec. 24, 2015

(51) Int. Cl.
*G06F 9/46*    (2006.01)
*G06F 9/48*    (2006.01)
(Continued)

(52) U.S. Cl.
CPC ...... *G06F 9/30189* (2013.01); *G06F 9/30123* (2013.01); *G06F 9/3851* (2013.01);
(Continued)

(58) Field of Classification Search
CPC ...... G06F 9/30189; G06F 9/3851; G06F 9/48; G06F 9/3012; G06F 9/50; G06F 9/46;
(Continued)

(56) References Cited

U.S. PATENT DOCUMENTS 6,092,175 A * 7/2000 Levy .................. G06F 9/30076
712/215
6,931,639 B1 * 8/2005 Eickemeyer .......... G06F 9/3802
712/228

(Continued)

OTHER PUBLICATIONS

International Search Report and Written Opinion correlating to PCT/IB2013/050213 dated Sep. 26, 2013.

(Continued)

*Primary Examiner* — Aimee Li
*Assistant Examiner* — Courtney P Carmichael-Moody

(57) ABSTRACT

A processor includes an instruction pipeline. The pipeline can be operated alternatively in a multi-thread mode and in a single-thread mode. In the multi-thread mode, the instruction pipeline processes multiple threads in an interleaved or simultaneous manner. In the single-thread mode, the pipeline processes a single thread. The instruction pipeline comprises multiple functional units, each of which is reserved for one thread among the multiple threads when the pipeline is in the multi-thread mode and reserved for one context layer among multiple context layers when the instruction pipeline is in the single-thread mode.

14 Claims, 5 Drawing Sheets

(51) Int. Cl.
*G06F 9/38* (2018.01)
*G06F 9/30* (2018.01)
*G06F 9/50* (2006.01)

(52) U.S. Cl.
CPC ............ *G06F 9/3891* (2013.01); *G06F 9/462* (2013.01); *G06F 9/48* (2013.01); *G06F 9/50* (2013.01)

(58) Field of Classification Search
CPC .... G06F 9/461; G06F 9/5016; G06F 9/30123; G06F 9/462
See application file for complete search history.

(56) References Cited

U.S. PATENT DOCUMENTS

| | | | | |
|---|---|---|---|---|
| 7,117,346 B2 * | 10/2006 | Moyer | ................ | G06F 9/30123 712/228 |
| 7,418,582 B1 * | 8/2008 | Iacobovici | .......... | G06F 9/30043 712/228 |
| 7,596,682 B2 * | 9/2009 | Shippy | ................ | G06F 9/30101 712/228 |
| 9,619,231 B2 * | 4/2017 | Catherwood | ........... | G06F 9/462 |
| 2003/0033509 A1 | 2/2003 | Leibholz et al. | | |
| 2005/0273785 A1 * | 12/2005 | Kass | ....................... | G06F 9/461 718/100 |
| 2006/0212687 A1 | 9/2006 | Chen | | |
| 2007/0106827 A1 * | 5/2007 | Boatright | ................ | G06F 13/26 710/263 |
| 2008/0040579 A1 * | 2/2008 | Kang | .................... | G06F 9/3851 712/205 |
| 2010/0125722 A1 * | 5/2010 | Hickey | ................ | G06F 9/3851 712/228 |

OTHER PUBLICATIONS

Mikschl, A. et al., Abstract for MSparc: A Multithreaded Spare, IN: Euro-Par'96 Parallel processing, Springer Berline Heidelberg, 1996.
Zhou, H. Dual-Core Execution: Building a Highly Scalable Single-Thread Instruction Window, IN: the 14th International Conference on Parallel Architectures and Compilation Techniques, IEEE, 2005, p. 231-242.
E200_z650n3 Rev 3.0 reference Manual.

* cited by examiner

INTEGRATED CIRCUIT PROCESSOR AND METHOD OF OPERATING THE INTEGRATED CIRCUIT PROCESSOR IN DIFFERENT MODES OF DIFFERING THREAD COUNTS

FIELD OF THE INVENTION

This invention relates to a integrated circuit processor and to a method of operating a integrated circuit processor.

BACKGROUND OF THE INVENTION

A thread is a sequence of instructions of a program. More specifically, a thread may be defined as the smallest sequence of programmed instructions that can be managed independently by an operating system scheduler. A program may be implemented as a single-thread or as multiple threads. A process is a sequence of programmed instructions that may comprise one or more threads.

Multi-threading is a technique in which a integrated circuit processor switches repeatedly between multiple threads of a process. The multiple threads, e.g. two, three, four, or more threads, may thus be executed quasi simultaneously. Each thread may for example be assigned a specific time slot in a frame of a processing schedule. The processing schedule may comprise a sequence of frames, each frame consisting of multiple time slots. For example, considering a process with two threads, e.g. thread zero and thread one, the integrated circuit processor may be arranged to execute thread zero during a first slot of each frame and thread one during a second slot of the same frame. Threads zero and one may thus be executed in an alternating manner. Multi-threading may thus be considered an example of time division multiplexing. The various threads within a process may share resources allocated to that process. A resource may, for example, include an amount of memory or a bus bandwidth.

US patent application publication number US 2006/0212687 A1 by Chen and Sutardja describes a integrated circuit processor comprising a set of registers wherein each set of registers is associated with a specific processor thread. In order to switch among the processor threads, a state of a currently executing processor thread is stored in a corresponding set of registers and a state of another processor thread is loaded from a corresponding set of registers to allow for processing the other processor thread.

A integrated circuit processor core may be arranged to execute various processes successively. That is, a new process may be started only when a previous process has been terminated. Ending one process and starting a subsequent process is an example of a context switch. Another example of a context switch is the suspension of a current process by an interrupt service routine in response to an interrupt. An interrupt is any event, e.g., an exception signal, that triggers execution of an interrupt service routine. An interrupt service routine is a process having a higher priority than the interrupted process. Execution of an interrupt service routine may in turn be interrupted by another interrupt service routine having an even higher priority.

Depending on the design of the integrated circuit processor, a context switch may have a latency that may be non-negligible. This may notably be the case when the integrated circuit processor needs to store the current state of a current process in a memory outside the integrated circuit processor (external memory) so that the process may be resumed at a later point in time, for instance upon completion of an interrupt service routine. Similarly, a context switch back to the original process may involve a non negligible latency as data may have to be retrieved from the external memory in order to restore the state of the original process. The latency may be reduced by providing multiple register sets inside the integrated circuit processor so that states of multiple processes may be stored within the integrated circuit processor.

SUMMARY OF THE INVENTION

The present invention provides a integrated circuit processor and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
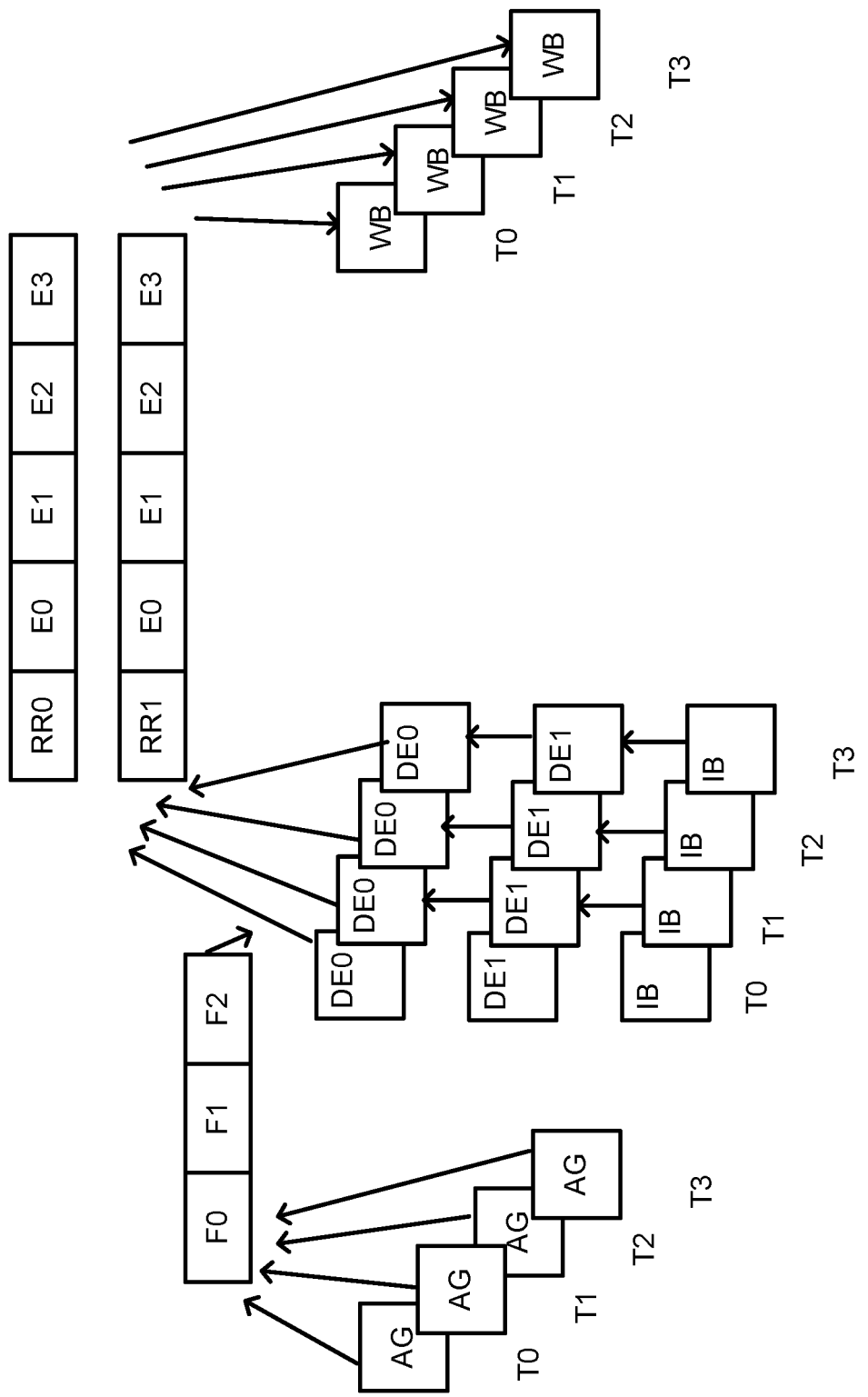
FIG. 1 shows a flow chart of an example of an embodiment of a multi-threaded pipeline.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on transitory or non-transitory computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programs with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

FIG. 1 illustrates an example of a multi-threaded pipeline. The pipeline may be implemented in, e.g., a integrated circuit processor core. The pipeline may be arranged to process multiple threads quasi simultaneously, e.g., using a time multiplexing technique. In the shown example, the pipeline is processing a first thread (thread zero) and a second thread (thread one) quasi simultaneously. Each instruction of each thread may be processed in several successive stages of the pipeline. In a first stage, an instruction may be fetched from, e.g., a program memory. The program memory may be located within the integrated circuit processor. The pipeline may, for example, comprise an initial address generation stage AG, fetch stages F0, F1, and F2, instruction buffer and decoding stages IB, DE0, and DE1, execution stages RR0 (for pipeline 0 of a dual-issue integrated circuit processor), RR1 (for pipeline 1 of a dual-issue integrated circuit processor), E0, E1, and E2, and a write back stage WB. These stages may involve fetching an instruction; decoding the instruction; executing the instruction; and writing back a result. Each stage may extend across one or more clock cycles. With each new clock cycle, an instruction may proceed to the next stage of the pipeline.

The pipeline may notably be a superscalar pipeline, that is, a pipeline capable of processing instructions of one or more threads simultaneously, e.g., in parallel or in an overlapping manner, as schematically indicated by the two rows RR0, E0, E1, E2 and RR1, E0, E1, E2, for example. When the pipeline is in the multi-thread mode, it may contain instructions from different threads.

The hardware for implementing the various stages, or part of it, may be shared among the multiple (e.g., two, three, or four) threads, while other hardware may be reserved for a specific thread. For example, memory cells, such as registers, for implementing the fetch and execution stages of, e.g., F0 to E3, may be shared among the multiple threads. In contrast, the AG, DE0, DE1, IB and WB stages may be performed for each thread using private hardware of the respective thread.

Each thread may have associated with it one or more resources reserved for that thread. The resource reserved for a given thread may be referred to as a private resource of that thread. For example, a integrated circuit processor for processing a total number of N threads may comprise N private register sets associated with the N threads, respectively.

Figure 2:
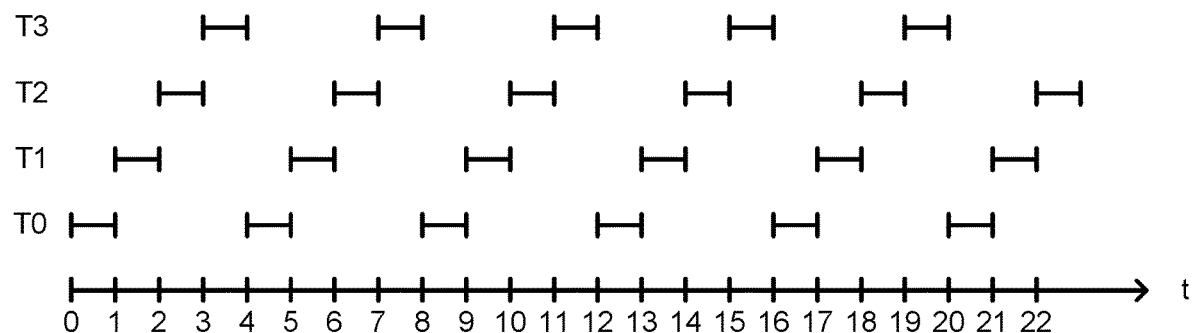
FIG. 2 shows a diagram illustrating an example of an embodiment of a multi-thread mode.

An example of a multi-thread mode of the pipeline described above in reference to FIG. 1 is illustrated in FIG. 2. In the multi-thread mode, instructions of one or more threads are allowed to be in the pipeline at any time. In the shown example, four threads T0, T1, T2, and T3 are processed in a time multiplex scheme. The scheme may involve a succession of time frames, each frame comprising several slots corresponding to the multiple threads, e.g., to the four threads T0 to T3. Each slot may have a length of one or more clock cycles. Each frame may for instance comprise a first, second, third and fourth slot for the threads T0, T1, T2, and T3, respectively. In an example in which each slot has a length of only one clock cycle, each frame may thus have a length of four clock cycles. In the shown example, frames 1, 2, 3, 4, 5, and 6 may correspond to the following time intervals: 0 to 4, 4 to 8, 8 to 12, 12 to 16, 16 to 20, and 20 to 24, respectively. Execution of the threads T0 to T3 may be quasi simultaneous in the sense that each thread may be processed during each frame. In addition, in superscalar processors, more than one thread may be in a given pipeline stage at a given moment in time. The threads T0, T1, T2, and T3 in FIG. 1 may therefore overlap.

In the example of FIG. 2, each thread is allocated the same amount of processing time, namely, one quarter of the total processing time. However, this is only an example, and the processing time may be shared differently among the various threads. Furthermore, a thread may be halted while one or more other threads may be further processed.

Figure 3:
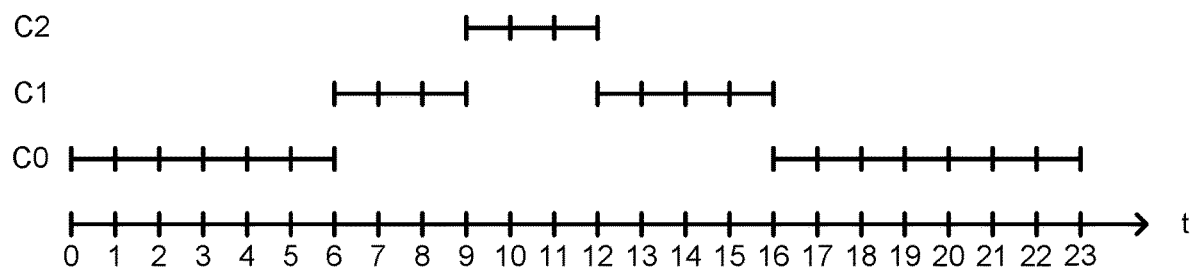
FIG. 3 shows a diagram which schematically illustrates an example of an embodiment of a single-thread mode.

FIG. 3 illustrates an example of a single-thread mode of the same pipeline. In the single-thread mode, only instructions of a single thread are allowed to be in the pipeline at any time. In the single-thread mode, the single thread that is passed through the pipeline may be a process or a sequence of processes, each process having only one thread. Each process may belong to one of multiple context layers. Three context layers C0, C1, and C2 are indicated in the figure as an example. For instance, a process executed between times 0 and 6 and between times 16 and 23 may belong to context layer C0. Between times 6 and 16 this process may be interrupted by another process, e.g., an interrupt service routine, belonging to context layer C1. The process of context layer C1 may in turn be interrupted by a process of context layer C2 between time 9 to 12, for example. In the example of FIG. 3, a context switch thus takes place at times 6, 9, 12, and 16, respectively. It is pointed out that this is only an example and that the instant of a context change may, for example, depend on specific events, notably external events such as a user input or detection of an external signal. Although three context layers are shown in the figure, there may be less than three or more than three context layers. In the single-thread mode, the pipeline may be flushed in response to a context switch. It may thus be ensured that the pipeline will contain instructions of only one thread at any time when in the single-thread mode.

Figure 5:
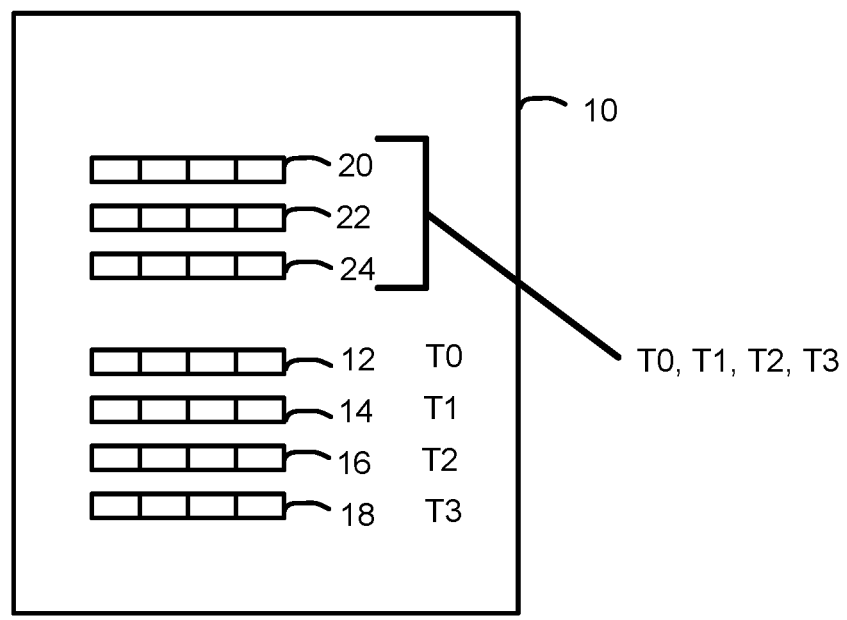
FIG. 5 schematically illustrates an example of an embodiment of a integrated circuit processor.

An example of a integrated circuit processor core 10 for implementing the pipeline described in reference to FIGS. 1, 2 and 3 is schematically shown in FIG. 5. The integrated circuit processor core 10 may be part of a single-core or multi-core processor. The processor core 10 may notably comprise multiple register sets, e.g., four register sets 12, 14, 16, and 18. Each register set may comprise one or more registers. Each of the register sets, 12, 14, 16, and 18 may be associated with one of the threads, e.g., threads T0, T1, T2 and T3, that can be processed by the multi-threaded pipeline. More specifically, each of these register sets 12, 14, 16, and 18 may be reserved for a particular thread. The total number of these register sets may thus coincide with the total number of threads that can be handled by the processor 10. Although only four threads T0, T1, T2, and T3, are mentioned explicitly here, the underlying concept is applicable to any number of threads, e.g., threads T0, T1, T2, T3, . . . , T_N.

In other words, each thread-associated register set may be a private resource of the respective thread. A private resource of a given thread is a resource, e.g., a memory resource or a bandwidth, that is available to that thread only.

The processor 10 may further comprise one or more shared register sets which may be shared among the multiple threads. In the shown example, the processor 10 may comprise for example shared register sets 20, 22, and 24.

In the single-thread mode, each of the thread-associated register sets, e.g., register sets 12, 14, 16, and 18, may be reserved for a particular context layer. For instance, the register sets 12, 14, 16, and 18 may be reserved for threads T0, T1, T2, and T3 in the multi-thread mode and for context layers C0, C1, C2, and C3 in the single-thread mode.

The hardware for supporting multi-threading may thus be used to enable very rapid context switching. No additional hardware may be required for this. The processor 10 may allow a customer or a user to select either the multi-thread mode or the single-thread mode. The customer may, for instance, use the processor 10 for executing single-thread legacy code. When the legacy code is replaced by a multi-thread code, e.g. when a software update becomes available, the customer may deactivate the single-thread mode and activate the multi-thread code. The existing processor may thus remain in service and does not need to be replaced by a dedicated multi-thread processor.

The proposed context switch scheme may involve no or only a negligibly small additional hardware overhead. Registers for supporting multi-threading may be reused to support rapid context switching. This idea can be expanded from dual thread to any number of threads, with each thread providing an additional layer of context.

The multithread mode described above in reference to FIG. 3 may be an example of a coarse-grained multithread (CMT) mode. A CMT mode is further illustrated schematically in FIG. 4 (plot B) along with a single-thread mode (plot A), a fine-grained multithread (FMT) mode (plot C), and a simultaneous multi-thread (SMT) mode (plot D). The flow of time (t) is represented by the horizontal arrow and measured in units of, e.g., one clock cycle. In each of the examples A, B, C, and D, of FIG. 4, four instructions may be processed simultaneously in each clock cycle. Each square box in the figure corresponds to one instruction. Instructions of a first thread T0, a second thread T1, a third thread T2, and a fourth thread T3 are labeled 0, 1, 2, and 3,
respectively. Furthermore, system instructions which do not belong to any thread are labeled OS (see FIG. 4, plot A).

Figure 4:
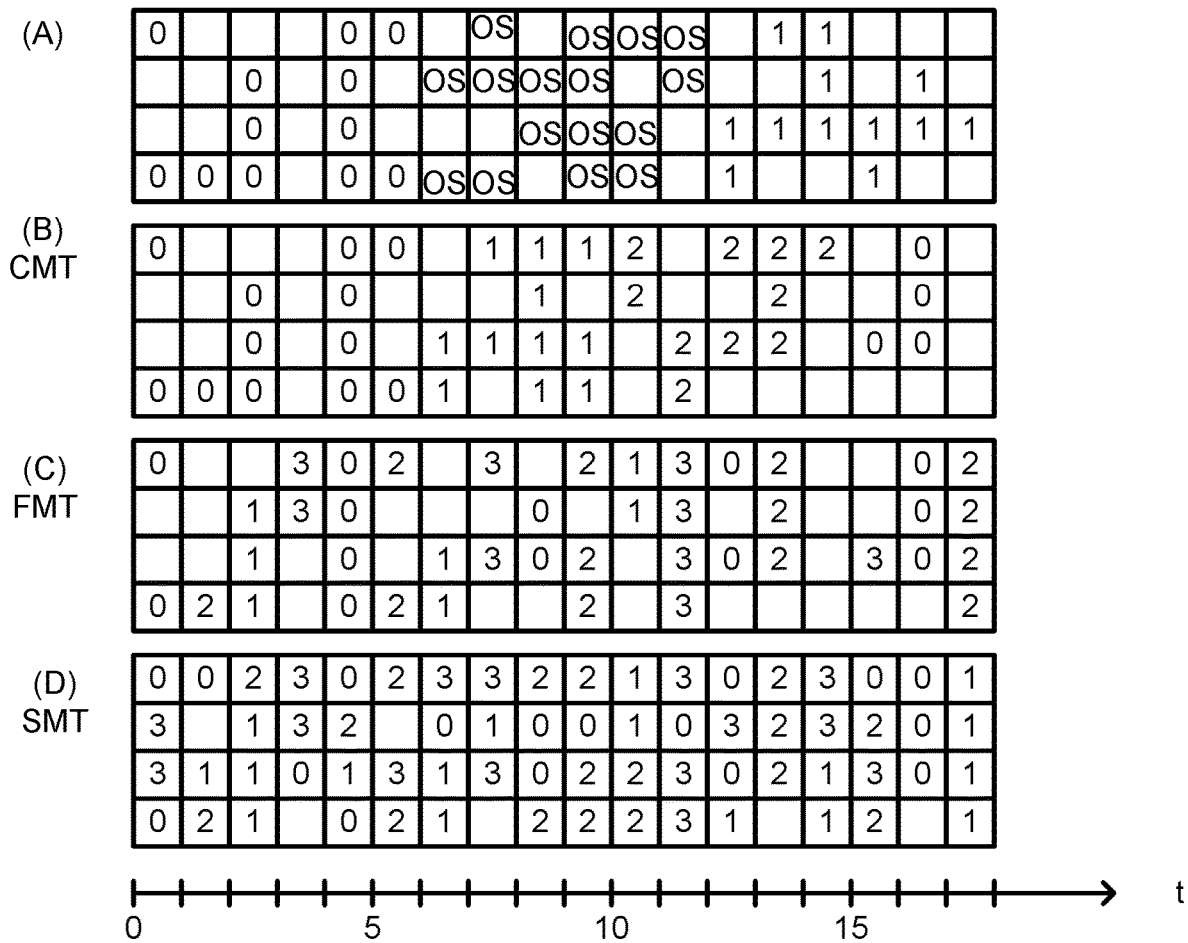
FIG. 4 schematically illustrates examples of four different threading techniques.

In the example of FIG. 4, plot A, the threads T0 and T1 may be processes, notably independent processes. A context switch from T0 to T1 may be performed between times 5 and 12, for example. Between times 5 and 12, the processor may thus execute system operations OS for switching from T0 to T1. Such system instructions may represent a non-negligible overhead in case of frequent context switches.

In the multithreaded modes, in contrast, the processor may switch from one thread to another thread without any overhead. In FIG. 4, plot B, for example, a thread change may be triggered by, e.g., a cache miss, and be performed without executing any switching code between the successive threads.

Figure 6:
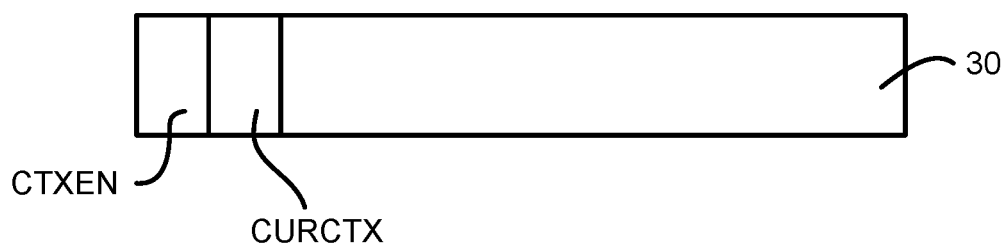
FIG. 6 schematically shows an example of an embodiment of a register for selecting either the multi-thread mode or the single-thread mode as an active operating mode.

Referring now to FIG. 6, an example of a processor register 30 is schematically shown. This register may for example be included in one of the shared register sets 20, 22, 24 shown in FIG. 5. The register 30 may act as a mode selection unit for selecting one among the multi-thread mode and the single-thread mode as an active mode. The active mode is the mode in which the processor 10 is currently operating. The register may comprise, for example, a first bit and a second bit for holding a binary variable CTXEN and CURCTX respectively. Use of these variables is further described in reference to FIG. 7.

Figure 7:
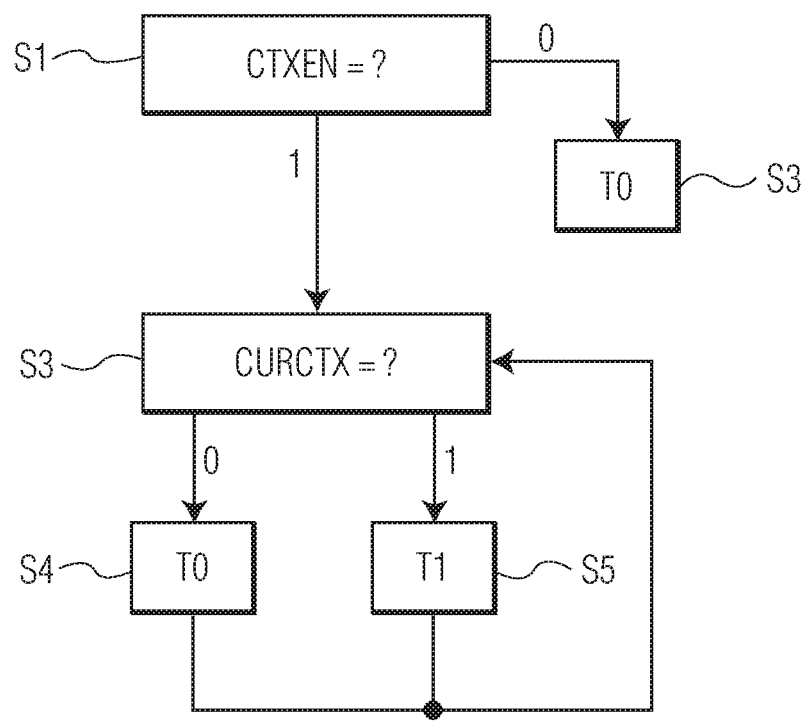
FIG. 7 shows a flow chart of an example of an embodiment of a method of enabling or disabling context switching in a single-thread mode.

FIG. 7 refers to an example of a dual thread processor capable of processing a first thread T0 and a second thread T1 simultaneously or quasi-simultaneously, that is, without executing any context switch instructions between an execution of instructions of T0 and an execution of T1. In this example, setting the variable CTXEN equal to 1 may enable use of private resources, e.g., registers, of a disabled thread (e.g., T1) to provide an alternate context for an enabled thread (e.g., T0) (blocks S1, S3). In contrast, setting CTXEN equal to 0 may disable using the private resources of any disabled thread (e.g., T1) as an alternate context for an enabled thread (e.g., T0) (blocks S1, S2). The value CTXEN=1 may be ignored if the two threads T0 and T1 are both enabled.

The variable CURCTX may be used to define the context to use by thread T0 when CTXEN equals one. For example, when CURCTX is zero, the context of thread T0 may be used (block S4). When CURCTX equals one, the context of thread one may be used (block S5). CURCTX may be updated via a software or hardware mechanism.

A single thread mode of operation of a Central Processing Unit (CPU) supporting multi-threading may thus be provided. In the single thread mode, multi-thread registers may be used to implement an alternate context hardware, thus providing extremely rapid context switching.

The example of FIG. 7 can be generalized to a multi-thread processor that is capable of processing N threads simultaneously or quasi-simultaneously. The number of threads N may be two or greater than two. CURCTX may be a multi-bit field for selecting one of the N threads so that the private resources of the selected thread may be used for alternate context layers of a first thread.

In the foregoing specification, the invention has been described with reference to specific examples of embodiments of the invention. It will, however, be evident that various modifications and changes may be made therein without departing from the broader spirit and scope of the invention as set forth in the appended claims.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Also for example, in one embodiment, the illustrated examples may be implemented as circuitry located on a single integrated circuit or within a same device. For example, the processor 10 may be implemented as a microprocessor, that is, a processor in a single integrated circuit. Alternatively, the examples may be implemented as any number of separate integrated circuits or separate devices interconnected with each other in a suitable manner. For example, the processor 10 may comprise one or more memory units, an instruction decoding unit, and an arithmetic logic unit, each of these units implemented as a separate integrated circuit.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A integrated circuit processor comprising an instruction pipeline operable alternatively in a multi-thread mode and in a single-thread mode; wherein said instruction pipeline, when in said multi-thread mode, is arranged to process multiple threads, and when in said single-thread mode is arranged to process a single thread;

said instruction pipeline comprising multiple register sets including a first register set and a second register set, each of said multiple register sets reserved for one thread among said multiple threads when said pipeline is in said multi-thread mode, and each of said multiple register sets is capable of being used for a corresponding context layer when said instruction pipeline is in said single-thread mode, wherein, in said single-thread mode, said multiple register sets enable a context switch from a first context layer in the first register set executed during a first particular time range of the execution of the single thread to a second context layer in the second register set executed during a second particular time range of the execution of the single thread, in which the first register set stores data associated with the first context layer which includes state information for restoring an interrupted process, wherein the integrated circuit processor further comprises a control register which is accessed in single-thread mode and has a first binary variable which indicates that the single thread may use a register set of the multiple register sets corresponding to a disabled thread of the multiple threads for the second context layer upon the context switch, and a second binary variable which identifies the second register set to be used for the second context layer upon the context switch in the single thread wherein the second binary variable of the control register identifies the second register set during execution of the first context layer, prior to the context switch to the second context layer.

2. The integrated circuit processor of claim 1, each of said multiple register sets comprising a set of registers.

3. The integrated circuit processor of claim 1, wherein when said pipeline is in said single-thread mode, each of said multiple register sets stores data associated with the corresponding context layer of the multiple context layers.

4. The integrated circuit processor of claim 3, wherein said data associated with the corresponding context layer of the multiple context layers includes state information for restoring an interrupted process.

5. The integrated circuit of claim 1, further comprising a mode selection unit for selecting an active mode among said multi-thread mode and said single-thread mode.

6. The integrated circuit processor of claim 1, wherein said instruction pipeline is implemented in a single core of said integrated circuit processor.

7. The integrated circuit processor of claim 1, wherein said instruction pipeline is capable of containing instructions from different threads when in said multi-thread mode.

8. The integrated circuit processor of claim 1, wherein said instruction pipeline is arranged to contain instructions from only one thread when in said single-thread mode.

9. The integrated circuit processor of claim 1, wherein said instruction pipeline is arranged to be flushed in response to a context change.

10. The integrated circuit processor of claim 1, wherein said instruction pipeline is arranged to process multiple threads in an interleaved or simultaneous manner when in said multi-thread mode.

11. A method of operating an integrated circuit processor comprising an instruction pipeline, said method comprising:
   operating said instruction pipeline alternatively in a multi-thread mode and in a single-thread mode;
   when said instruction pipeline, is operating in said multi-thread mode, processing multiple threads in an interleaved or simultaneous manner;
   when said instruction pipeline is operating in said single-thread mode, processing a single thread having multiple context layers,
   wherein said instruction pipeline comprises multiple register sets including a first register set and a second register set, wherein each of said multiple register sets is reserved for one thread among said multiple threads when said pipeline is in said multi-thread mode, and each of said multiple register sets is capable of being used for a different context layer among said multiple context layers when said instruction pipeline is in said single-thread mode; and
   storing, in a first control register, a first binary variable which indicates that the single thread may use a register set of the multiple register sets corresponding to a disabled thread of the multiple threads for the second context layer upon the rapid context switch, and a second binary variable which identifies the second register set to be used for the second context layer upon the rapid context switch in the single thread;
   performing a context switch in said single-thread mode from a first context layer in the first register set executed during a first particular time range of the execution of the single thread to a second context layer in the second register set executed during a second particular time range of the execution of the single thread, in which the first register set stores data associated with the first context layer which includes state information for restoring an interrupted process, wherein performing the context switch comprises accessing the first control register, wherein the storing occurs prior to performing the context switch such that the second binary variable of the control register identifies the second register set during execution of the first context layer, prior to the context switch to the second context layer.

12. The method of claim 11, wherein when said instruction pipeline is operating in said multi-threaded mode, the method further comprises processing multiple threads using time multiplexing.

13. The method of claim 11, wherein said instruction pipeline is arranged to contain instructions from only one thread when in the single-thread mode.

14. The method of claim 11, wherein said instruction pipeline is arranged to process multiple threads simultaneously.

* * * * *